United States Patent [19]
Hashimoto

[11] Patent Number: 5,550,992
[45] Date of Patent: Aug. 27, 1996

[54] TRANSMISSION TIMING CONTROL IN A BASE STATION FOR CELLULAR TDMA MOBILE COMMUNICATION BY RECEIVING AN UP-LINK SIGNAL FOR A DIFFERENT BASE STATION

[75] Inventor: Tadao Hashimoto, Tokyo, Japan

[73] Assignee: NEC Corporation, Tokyo, Japan

[21] Appl. No.: 86,845

[22] Filed: Jul. 7, 1993

[30] Foreign Application Priority Data

Jul. 9, 1992 [JP] Japan .................................... 4-182024

[51] Int. Cl.⁶ .................................................... H04L 7/00
[52] U.S. Cl. .......................... 375/355; 455/55.1; 370/108
[58] Field of Search .......................... 375/107; 455/54.1, 455/55.1, 56.1

[56] References Cited

U.S. PATENT DOCUMENTS

| | | | |
|---|---|---|---|
| 4,800,560 | 1/1986 | Aoki et al. | 370/104 |
| 5,261,118 | 11/1993 | Vanderspoll, II et al. | 375/107 X |
| 5,268,933 | 12/1993 | Averbuch | 375/107 |
| 5,293,380 | 3/1994 | Kondo | 370/108 X |

FOREIGN PATENT DOCUMENTS 2-238732  9/1990  Japan .

OTHER PUBLICATIONS

Heinz Ochsner, "DECT—Digital European Cordless Telecommunications", Apr. 29 to May 3, 1989, in San Francisco, California, at 39th IEEE Vehicular Technology Conference.

*Primary Examiner*—Stephen Chin
*Assistant Examiner*—Bryan E. Webster
*Attorney, Agent, or Firm*—Young & Thompson

[57] ABSTRACT

In each radio base station of a cellular mobile communication network in which a mobile station is communicative with the radio base stations through a time division multiplex radio link, a transmitter/receiver serves as a synchronization system in cooperation with a base station control unit (35) to synchronize a down-link radio signal generated from a transmission frame generator at a transmission time with a like down-link radio signal transmitted from a different one of the radio base stations. The synchronization system has a received frame regenerator for detecting a reception time of one of frames of an up-link radio signal directed from the mobile station to the different station. A timing controller calculates a time difference between the transmission and the reception time. Controlled by the control unit in accordance with the time difference, the timing controller controls, in turn, the transmission time. Preferably, the time difference is stored in a memory and read out by the control unit when the received frame regenerator receives another of the up-link frames that next follows the above-mentioned one up-link frame.

12 Claims, 6 Drawing Sheets

TRANSMISSION TIMING CONTROL IN A BASE STATION FOR CELLULAR TDMA MOBILE COMMUNICATION BY RECEIVING AN UP-LINK SIGNAL FOR A DIFFERENT BASE STATION

BACKGROUND OF THE INVENTION

1. Field of the Invention

This invention relates to a synchronization system for use in a radio base station of a cellular time division multiple access (TDMA) mobile communication network in controlling a transmission time instant of a down-link radio signal.

2. Description of the Related Art

Various digital mobile communication networks are recently known. In most of such networks, TDMA schemes are used. For example, a paper was presented at the 39th IEEE Vehicular Technology Conference held Apr. 29 to May 3, 1989, in San Fransisco, Calif., by Heinz Ochsner under the title of "DECT—Digital European Cordless Telecommunications".

In the manner which will later be described in greater detail, a general cellular mobile communication network has a service area divided into a plurality of cells or radio zones. A radio base station is situated in each radio zone. Such radio base stations are consequently in one-to-one correspondence to the radio zones. The radio base stations may be connected to a control station through wired and/or radio links. The control station is connected to a fixed communication network through wired links. At least one mobile station is present alive or active in the service area and may move from a radio zone to another radio zone. The mobile station, as herein called, may either be a cordless telephone set or a communication terminal installed on a mobile vehicle, such as an automobile.

While present active in a radio zone, a mobile station transmits an up-link radio signal to a radio base station corresponding to the radio zone under consideration. On the other hand, a radio base station transmits a down-link radio signal to mobile stations which may be currently present alive in a radio zone corresponding to the radio base station in question. Two adjacent ones of the radio base stations have an overlapping area in which a mobile station can receive the down-link radio signals from the radio base stations corresponding to the radio zones having the overlapping area and can transmit the up-link radio signal to these radio base stations.

When used in time division multiplex communication, each of the down-link and the up-link radio signals is represented by a sequence of time slots. The down-link radio signal comprises a down-link communication data signal and a down-link control signal which is used to indicate the mobile stations present in the radio zone corresponding to the radio base station transmitting the down-link radio signal in question. Incidentally, each radio base station can judge whether a received up-link radio signal is directed thereto or to a different radio base station.

In accordance with one of the TDMA schemes, a common control signal is used by time division in the down-link radio signals transmitted from the radio base stations of the mobile communication network. In such an event, an overlap in time should not take place among down-link control slots in which the base radio stations transmit the down-link control signals. This is because a mobile station can not duly receive the down-link control slots while present alive in the overlapping area.

This undue reception of the down-link control slots can be avoided by transmission of a reference timing signal representative of common timing instants for reference from the control station to all radio base stations of the mobile communication network. Based on the reference timing signal, the radio base stations determine transmission time instants of their respective down-link control slots in individually predetermined manners of preventing the overlap in time from taking place.

It is, however, difficult in practice to use the above-described manner of avoidance of the overlap in time when the radio base stations are controlled by two or more control stations. This is because the reference timing signal must be common to all radio base stations throughout the mobile communication network in spite of use of the control stations.

As consequence, it has been difficult in a conventional cellular TDMA mobile communication networks to reliably synchronize the down-link control slots transmitted from the radio base stations. This has resulted in an unstable service of the mobile communication network. Effective use of carriers for the down-link control signals have been impossible. In addition, it has been difficult to stably synchronize down-link communication slots used in transmitting the down-link communication data signals. This has made it difficult to effectively use frequency bands.

SUMMARY OF THE INVENTION

It is consequently an object of the present invention to provide a synchronization system for use in a radio base station of a cellular digital mobile communication network and which can make the communication network provide a stable service.

It is another object of this invention to provide a synchronization system which is of the type described and which can make it possible to effectively use frequency bands by the communication network.

It is still another object of this invention to provide a synchronization system which is of the type described and by which it is possible to establish synchronism of transmission time instants of the radio base station relative to like transmission time instants of different radio base stations sharing an overlapping area with the radio base station under consideration.

Other objects of this invention will become clear as the description proceeds.

On setting forth the gist of this invention, it should be understood that a synchronization system is for use in a cellular digital mobile communication network comprising a plurality of radio base stations and a mobile station communicative with the radio base station through a time division multiplex radio link.

In accordance with this invention, the synchronization system comprises in each radio base station (A) signal receiving means for receiving an up-link radio signal directed from the mobile station to a different one of the radio base stations to measure a reception time instant of reception of the up-link radio signal and (B) adjusting means for adjusting, based on the reception time instant, a transmission time instant of the above-mentioned each radio base station.

DESCRIPTION OF THE PREFERRED EMBODIMENT

Figure 1:
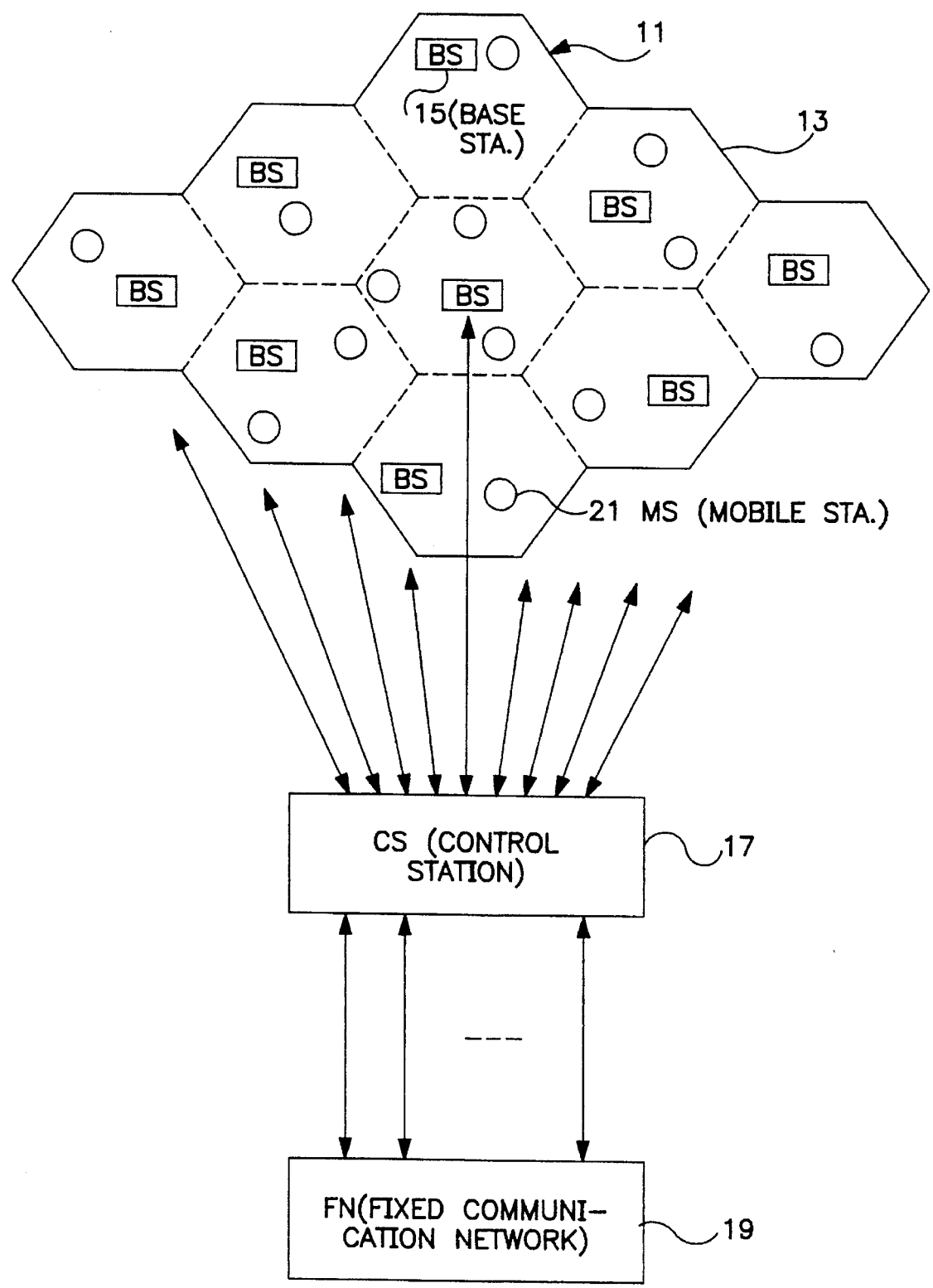
FIG. 1 is a block diagram schematically illustrative of a general cellular mobile communication network which is a cellular time division multiple access mobile communication network when used in describing a synchronization system according to an embodiment of the instant invention.

Referring to FIG. 1, a cellular time division multiple access (TDMA) mobile communication network has a service area 11 divided or partitioned into a plurality of cells or radio zones 13. Adjacent two of the radio zones 13 have an overlapping area. It should be understood that the dashed line show overlapping areas between adjacent two radio zones 13. The cellular TDMA mobile communication network is for use in describing a synchronization system according to a preferred embodiment of the present invention.

A radio base station 15 is situated in each radio zone 13. Such radio base stations 15 are consequently in one-to-one correspondence to the radio zones 13. In the illustrated example, the radio base stations 15 are connected to a control station 17 through wired and/or radio links. Only one of the links is depicted in full. Others are only partly depicted in order to simplify the illustration.

The control station 17 is connected to a fixed communication network 19 through wired links. The fixed communication network 19 comprises fixed network stations (not shown) connected to the wired links.

Mobile stations 21 are present in the service area 11. Each mobile station 21 is movable from a radio zone 13 to another radio zone 13. Each mobile station 21 may be a cordless telephone set. Alternatively, each mobile station 21 may be a communication terminal installed on a mobile vehicle which may be an automobile.

Figure 2:
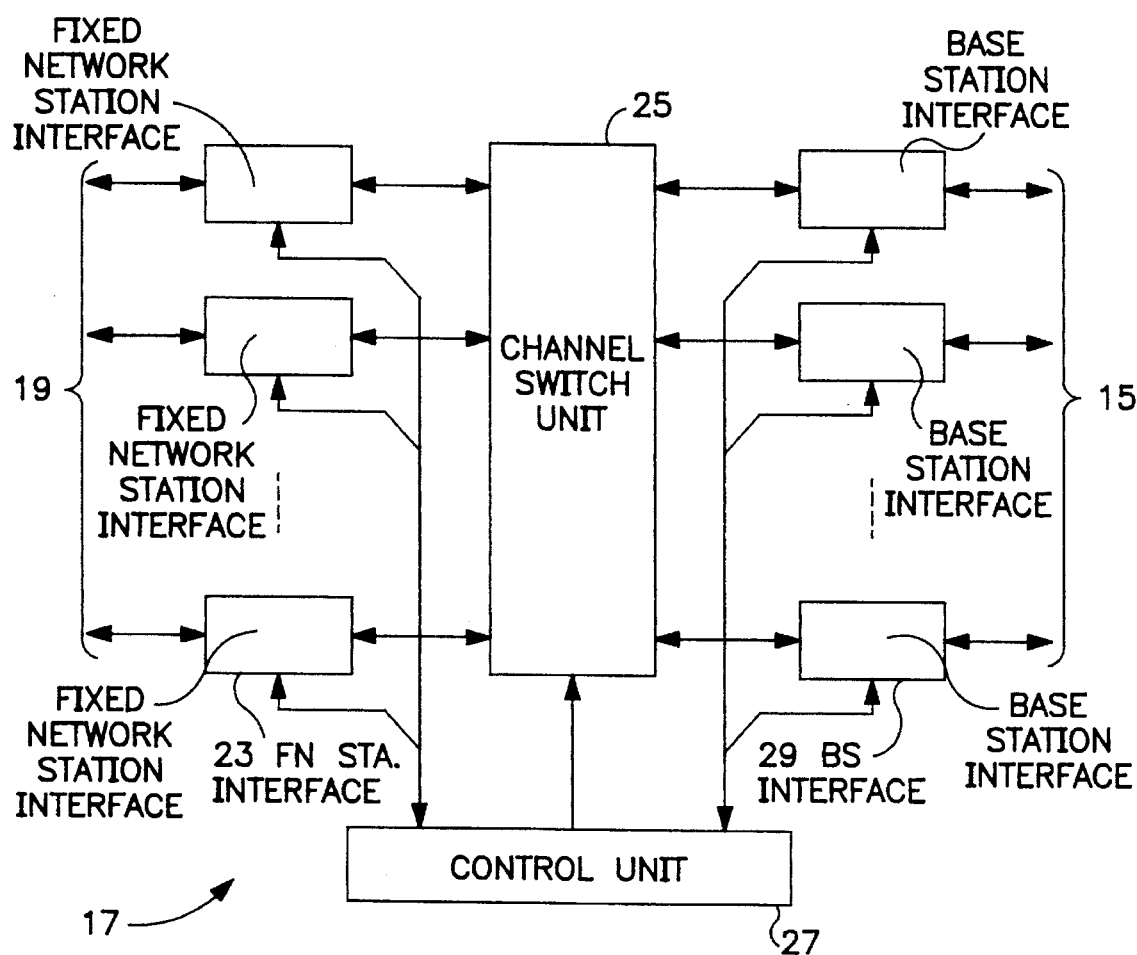
FIG. 2 is a block diagram of a control station for use in the cellular time division multiple access mobile communication network depicted in FIG. 1.

Turning to FIG. 2, the control station 17 comprises a plurality of fixed network (FN) station interface circuits 23 connected to the fixed network stations of the fixed communication network 19. A fixed-to-control signal is delivered at a time from each fixed network station to the control station 17. Each fixed network station interface circuit 23 separates the fixed-to-control signal into a fixed-to-control communication data signal and a fixed-to-control control signal. Being separated from the fixed-to-control signal, the fixed-to-control communication data signal is in correspondence to the fixed-to-control control signal. Such fixed-to-control communication data signals are sent to a channel switch unit 25. The fixed-to-control control signals are supplied to a control station control unit 27.

Responsive to each fixed-to-control control signal, the control station control unit 27 supplies a control station control signal to the channel switch unit 25. Controlled by the control station control signal, the channel switch unit 25 produces the corresponding fixed-to-control communication data signal as a switched communication data signal. Being produced under control of the control station control signal, the switched communication data signal is in correspondence to the fixed-to-control control signal.

Such switched communication data signals and the fixed-to-control control signals are delivered in pairs to base station (BS) interface circuits 29. Each base sation interface circuit 29 combines the switched communication data signal and the corresponding fixed-to-control control signal into a control-to-base signal. The base station interface circuits 29 supply such control-to-base signals to the radio base stations 15 in accordance with the fixed-to-control control signals included in the control-to-base signals.

Reversely, a base-to-control signal is delivered at a time from each radio base station 15 to the control station 17. Like the fixed-to-control signals, such base-to-control signals are processed in the control station 17 into control-to-fixed signals. The control station 17 supplies the control-to-fixed signals to the fixed network stations of the fixed communication network 19 in accordance with control signals included in the control-to-fixed signals.

Figure 3:
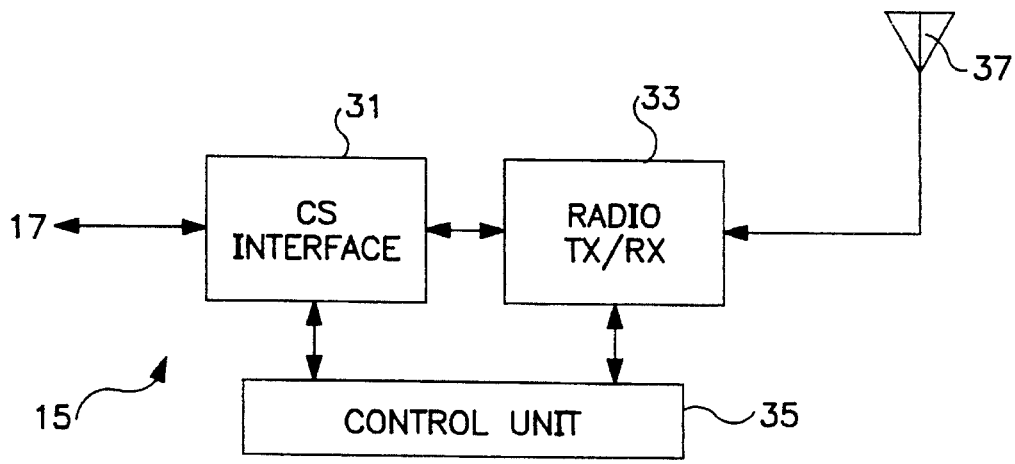
FIG. 3 is a block diagram of a radio base station which is for use in the cellular time division multiple access mobile communication network illustrated in FIG. 1 and which comprises the synchronization system.

Referring to FIG. 3, each radio base station 15 comprises a control station (CS) interface circuit 31 connected to the control station 17. Each of the control-to-base signals is supplied at a time from the control station 17 to the radio base station 15 being illustrated. The control station interface circuit 31 separates this control-to-base signal into a control-to-base communication data signal and a control-to-base control signal.

The control-to-base communication data signal is delivered to a base station radio transmitter/receiver 33. The control-to-base control signal is sent to a base station control unit 35. Dealing with the control-to-base control signal in the manner known in the art, the base station control unit 35 produces a base station transmission control signal.

When supplied with the base station transmission control signal, the base station radio transmitter/receiver 33 feeds a base-to-mobile signal to a base station antenna 37 by combining the control-to-base communication data signal and the base station transmission control signal. The base station antenna 37 transmits such base-to-mobile signals as down-link radio signals towards the mobile station or stations 21 currently present in one of the radio zones 13 that corresponds to the radio base station 15 being illustrated.

An up-link radio signal is transmitted to the base station antenna 37 at a time from each of the mobile stations 21 which are currently present active in the corresponding radio zone 13. The up-link radio signal is delivered to the base station radio transmitter/receiver 33 as a mobile-to-base signal. The base station radio transmitter/receiver 33 separates the mobile-to-base signal into a mobile-to-base communication data signal and a mobile-to-base control signal.

The mobile-to-base communication data signal is delivered to the base station interface circuit 31. The mobile-to-base control signal is sent to the base station control unit 35. In a known manner, the base station control unit 35 processes the mobile-to-base control signal into a base station reception control signal. It should be noted in this regard that the base station control unit 35 furthermore deals with the mobile-to-base control signal in the manner which will become clear as the description proceeds.

Controlled by the base station reception control signal, the control station interface circuit 31 combines the mobile-to-base communication data signal and the mobile-to-base control signal into a base-to-control signal. Such base-to-control signals are delivered to the control station 17.

Figure 4:
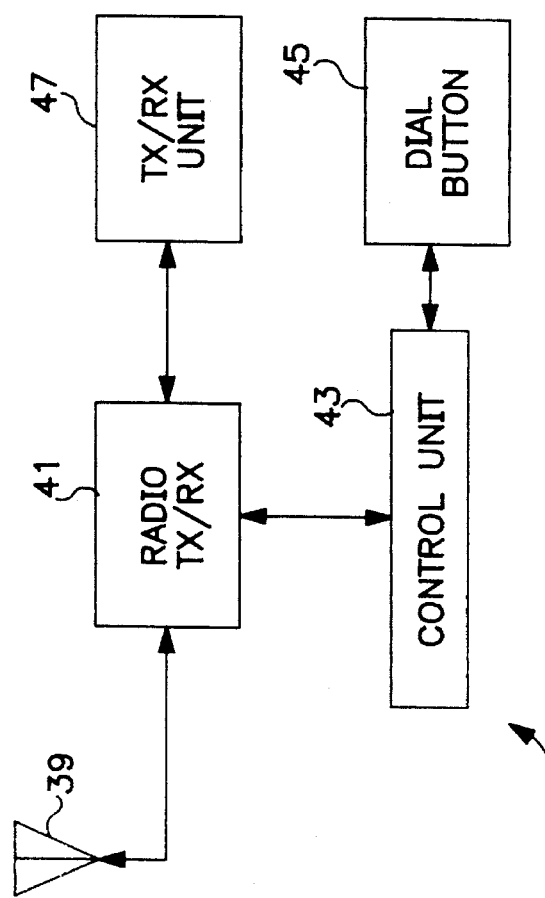
FIG. 4 is a block diagram of a mobile station for use in the cellular time division multiple access mobile communication network illustrated in FIG. 1.

Turning to FIG. 4, each down-link radio signal is transmitted to a mobile station antenna 39. Receiving the down-link radio signal, the mobile station antenna 39 sends a base-to-mobile signal to a mobile station radio transmitter/receiver 41. The mobile station radio transmitter/receiver 41 separates the base-to-mobile signal into a base-to-mobile communication data signal and a base-to-mobile control signal.

The base-to-mobile control signal is delivered to a mobile station control unit 43. Processing the base-to-mobile control signal in the manner known in the art, the mobile station control unit 43 produces a mobile station reception control signal. The mobile station reception control signal monitors a dial button unit 45 which is handled by a user of or an attendant to the mobile station 21 being illustrated.

If the dial button unit 45 indicates that a transmitter/receiver unit 47 is ready for reception of the base-to-mobile communication data signal, the mobile station control unit 43 makes the mobile station radio transmitter/receiver 41 send the base-to-mobile communication data signal to the transmitter/receiver unit 47 for reception of the base-to-mobile communication data signal. The transmitter/receiver unit 47 may be a handset when the base-to-mobile communication data signal represents a voice signal. Alternatively, the transmitter/receiver unit 47 may be a data terminal when the base-to-mobile communication data signal represents a data signal.

On initiating communication from the mobile station 21 being illustrated, the user or the attendant handles the dial button unit 45 and puts the transmitter/receiver unit 47 in operation. A mobile-to-base communication data signal is delivered from the transmitter/receiver unit 47 to the mobile station radio transmitter/receiver 41. A mobile station transmission control signal is supplied from the dial button unit 45 to the mobile station control unit 43.

In compliance with the mobile station transmission control signal, the mobile station control unit 43 delivers a mobile-to-base control signal to the mobile station radio transmitter/receiver 41. By combining the mobile-to-base communication data signal and the mobile-to-base control signal, the mobile station radio transmitter/receiver 41 feeds a mobile-to-base signal to the mobile station antenna 39. Such mobile-to-base signals are transmitted from the mobile station antenna 39 as up-link radio signals primarily towards one of the radio base stations 15 that corresponds to the radio zone 13 the illustrated mobile station 21 is currently present in.

In this manner, each mobile station 21 is related at a time to a particular base station of the radio base stations 15 while present active in one of the radio zones 13 that corresponds to the particular base station. Each mobile station 21 receives a down-link radio signal transmitted from the particular base station while present alive in the radio zone 13 in question.

In the manner described in the foregoing with reference to FIGS. 1 through 4, the particular base station may transmit the down-link radio signal in response to a fixed-to-control signal eventually delivered thereto in accordance with the fixed-to-control control signal included in the fixed-to-control signal under consideration. Similarly, a mobile station 21 may transmit the up-link radio signal to one of the fixed network stations in accordance with a mobile-to-base control signal included in the up-link signal. Alternatively, the particular base station may transmit the down-link radio signal to a particular mobile station in response to an up-link radio signal transmitted thereto from a different mobile station currently present in the radio zone 13 in which the particular mobile station is currently present. As a further alternative, the particular base station may transmit the down-link radio signal in response to a control-to-base signal transmitted thereto through a different base station and the control station 17 based on an up-link radio signal transmitted to the different base station from a different mobile station currently present in one of the radio zones 13 that corresponds to the different base stations.

Incidentally, the radio base stations 15 are not connected to one another in FIG. 1. Some or all of the radio base stations 15 may, however, be connected to one another to deliver and receive a base-to-base signal from one of such radio base stations 15 to another radio base station.

Figure 5:
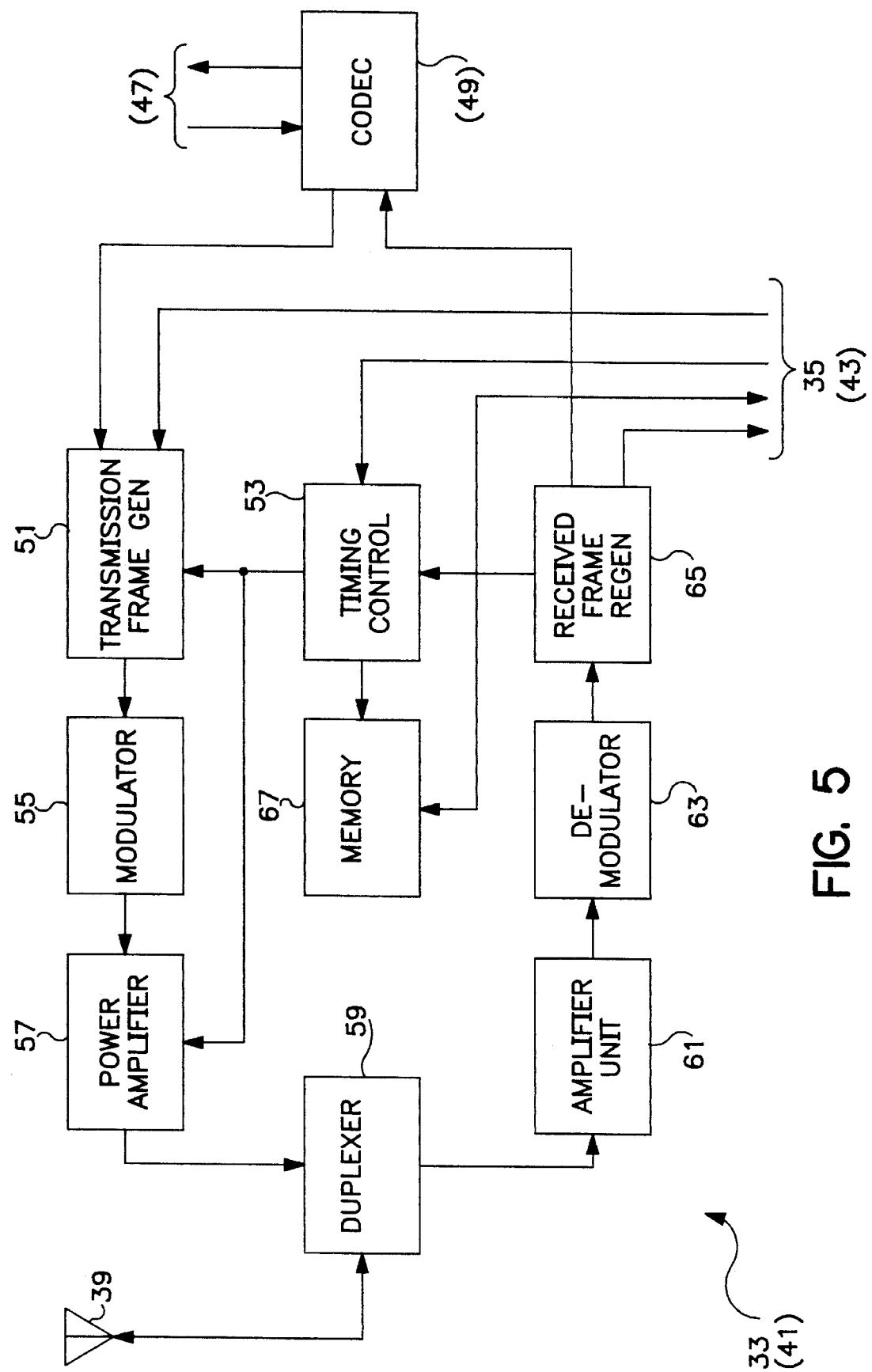
FIG. 5 is a block diagram of a radio transmitter/receiver which is for use in each radio base station of the type depicted in FIG. 3 and which is partly depicted as a radio transmitter/receiver for use in each mobile station of the type depicted in FIG. 4.

Referring now to FIG. 5, it should be known that a codec 49 is included in the mobile station radio transmitter/receiver 41 described in conjunction with FIG. 4 and is used for analog-to-digital and digital-to-analog conversion between the voice or the data signal of the transmitter/receiver unit 47 and the mobile-to-base or the base-to-mobile communication data signal used in the mobile station radio transmitter/receiver 41. The mobile station radio transmitter/receiver 41 is connected to the mobile station control unit 43.

The base station radio transmitter/receiver 33 is different in these respects from the mobile station radio transmitter/receiver 41 and is connected to the control station interface circuit 31 described in connection with FIG. 3 and to the base station control unit 35. In other respects, the mobile station radio transmitter/receiver 41 is similar in structure and may be simpler than the base station radio transmitter/receiver 33 in the manner which will readily be understood from the following by one skilled in the art.

In the base station radio transmitter/receiver 33, a transmission frame generator 51 is supplied with the control-to-base communication data signal from the control station interface circuit 31 and with the base station transmission control signal from the base station control unit 35 to which the control station interface circuit 31 sends the control-to-base control signal. Among the base station transmission control signal, transmission timing pulses are delivered from the base station control unit 35 to a timing controller 53 in the manner which will shortly be described more in detail.

Figure 6:
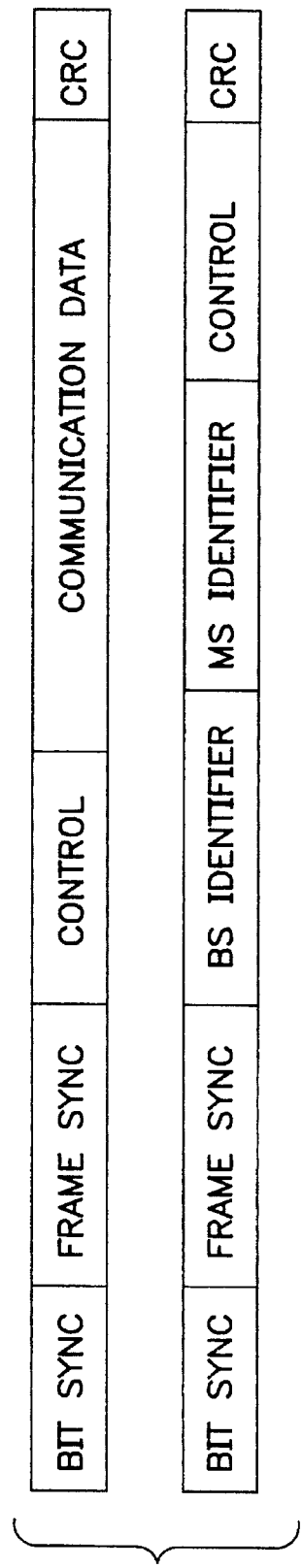
FIG. 6 schematically shows frame formats of a down-link communication data signal and of a down-link control signal which signals are transmitted from the radio base station mentioned in conjunction with FIG. 3.

Turning to FIG. 6 for a short while, each of the down-link and the up-link radio signals comprises a succession of communication data signal frames and control signal frames. Each communication data signal frame is exemplified along the upper row. Each control signal frame is exemplified along the lower row. Each of the communication data signal frame and the control signal frame includes a bit synchronization signal, a frame synchronization signal, and a cyclic redundancy check code CRC in the manner known in the art.

The communication data signal frame comprises a communication data signal. The control signal frame comprises a base station identifier code, a mobile station identifier code, and a control data signal. The base station identifier code indicates in the down-link radio signal a source base station which is the radio base station transmitting the down-link radio signal under consideration. In the up-link radio signal, the base station identifier code specifies a destination base station to which the up-link radio signal is directed. The mobile station identifier code similarly specifies a destination mobile station in the down-link radio signal and indicates a source mobile station in the up-link radio signal.

Figure 7:
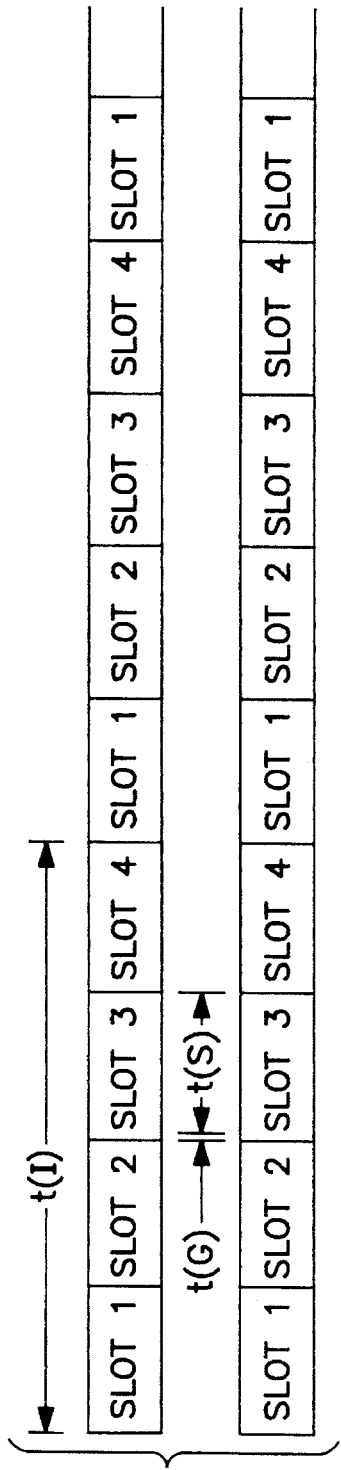
FIG. 7 schematically shows frame formats of the down-link control signal and of an up-link control signal which is transmitted from the mobile station mentioned in connection with FIG. 4.

Further turning to FIG. 7, the base station radio transmitter/receiver 33 transmits such successions of the communication data signal frames and the control signal frames as a sequence of time slots exemplified along the upper row. The mobile station radio transmitter/receiver 41 of each mobile station 21 transmits like successions of the communication data signal frames and the control signal frames as a sequence of time slots which are exemplified along the lower row and is in synchronism with the time slots transmitted to the mobile station in question.

In the example illustrated, each of the down-link and the up-link radio signals is a sequence of TDMA frames having a frame period t(F) in common and consisting essentially of a plurality of time slots having a slot length t(S) in common. In the illustrated example, each TDMA frame comprises four time slots numbered from 1 up to 4, both inclusive. Each slot length is preceded by a guard time t(G) known in the art.

In the down-link radio signal transmitted to a particular one of the mobile stations 21 that is currently present alive in one of the radio zones 13, a corresponding one of the radio base stations 15 uses a particularly numbered time slot in each TDMA frame. The particular mobile station transmits the up-link radio signal to the corresponding base station by using a specifically numbered time slot in each TDMA frame. The particularly and specifically numbered time slots may or may not be equally numbered. In this manner, the time slots in the down-link and the up-link radio signals are in one-to-one correspondence.

Turning back to FIG. 5, the transmission timing pulses define the time slots used in the down-link radio signal, one time slot in each TDMA frame. The transmission timing pulses therefore define a transmission time instant of the down-link radio signal. In accordance with this invention, the transmission time instant is controlled or adjusted in the manner which will presently be described.

Controlled by the transmission timing pulses supplied through the timing controller 53, the transmission frame generator 51 converts the control-to-base signal to transmission slots. In a modulator 55, a carrier signal is modulated by the transmission slots into the base-to-mobile signal. After being amplified by a power amplifier 57, the base-to-mobile signal is fed to the base station antenna 39 through a duplexer 59. Incidentally, the power amplifier 57 is switched on and off by the transmission timing pulses supplied thereto through the timing controller 53.

In FIG. 5, an amplifier unit 61 is supplied with the mobile-to-base signal derived from an up-link radio signal transmitted to the base station antenna 39 and delivered thereto through the duplexer 59. After being amplified, the mobile-to-base signal is demodulated by a demodulator 63 into a demodulated signal. From the demodulated signal, a received frame regenerator 65 regenerates, as received frames, a succession of communication data frames representative of the base-to-control communication data signal and a succession of control signal frames representative of the base station reception control signal.

Regenerated, the base-to-control communication data signal is delivered directly to the control station interface circuit 31. The base station reception control signal is sent to the base station control unit 35 and thence to the control station interface circuit 31 as the base-to-control control signal. If the radio transmitter/receiver is the mobile station radio transmitter/receiver 41, the base-to-mobile communication data signal is regenerated by the received frame regenerator 65 and delivered to the codec 49. The base-to-mobile control signal is likewise regenerated and sent to the mobile station control unit 43 and thence to the dial button unit 45 which is described in conjunction with FIG. 4.

Figure 8:
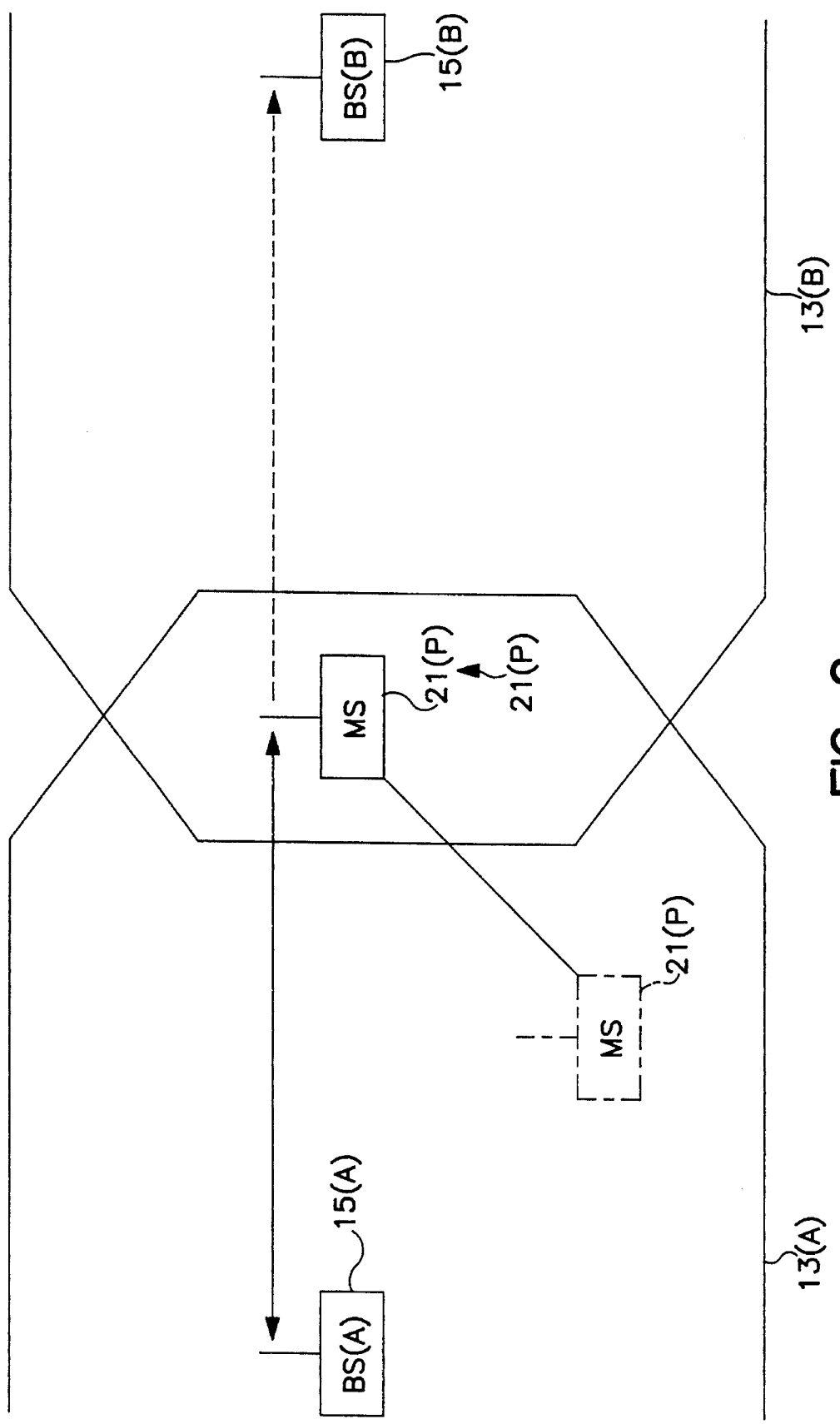
FIG. 8 schematically shows a part of the cellular time division multiple access mobile communication network depicted in FIG. 1.

Turning temporarily to FIG. 8, it will be assumed in the manner depicted by dashed lines that a particular mobile station 21(P) was in an A radio zone 13(A) of an A base station 15(A). In this event, the mobile station 21(P) was exchanging the up-link radio signal and the down-link radio signal with the A base station 15(A). Meanwhile, the mobile station 21(P) may move into an overlapping area of the A radio zone 13(A) and a B radio zone 13(B) of a B base station 15(B) of the radio base stations 15. The mobile station 21(P) still exchanges the up-link and the down-link radio signals with the A base station 15(A) in the manner indicated by a solid line. The B base station 15(B) can, however, receive from the mobile station 21(P) as indicated by a dashed line the up-link radio signal directed to the A base station 15(A), namely, to a different base station of the radio base stations 15.

Figure 9:
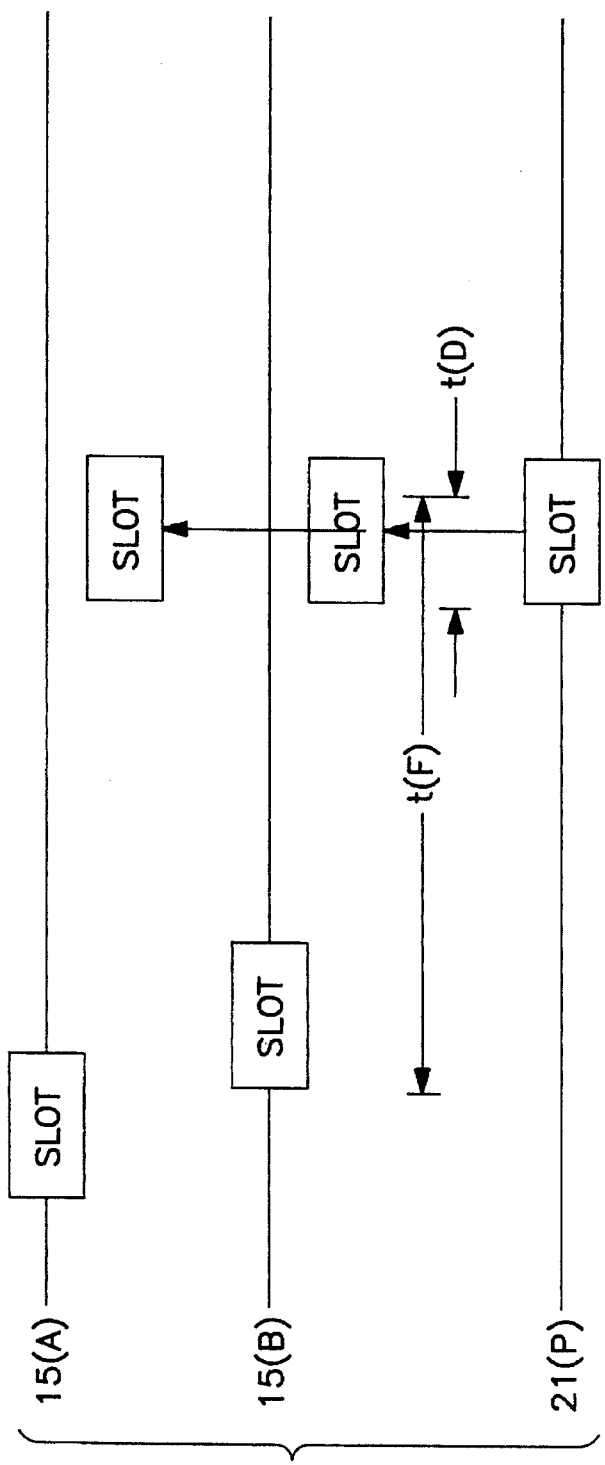
FIG. 9 schematically shows down-link control signals transmitted from two radio base stations of the type depicted in FIG. 3 and the up-link control signal.

Further turning to FIG. 9 with reference to FIG. 8 continued, an A down-link signal is transmitted in the manner depicted along a first or top row labelled 15(A) from the A base station 15(A) to the particular mobile station 21(P) which is present active in the overlapping area. In the A down-link signal, it will be surmised that a particular slot is transmitted to the mobile station 21(P) as exemplified by a rectangle.

The B base station 15(B) transmits a B down-link signal depicted along a second or middle row labelled 15(B) to the mobile station or stations 15 which are currently present in the B radio zone 13(B). The B down-link signal comprises time slots which are in one-to-one correspondence to the time slots included in the down-link radio signals transmitted from the A base station 15(A) to the mobile station or stations 15 which are currently present in the A radio zone 13(A). It will be presumed that one of the time slots of the B down-link signal corresponds to the particular slot of the A down-link signal as a corresponding slot depicted by another rectangle. The TDMA frame of the B down-link signal may or may not be concurrent with the TDMA frame of the A down-link signal.

In the manner described before, the particular mobile station 21(P) transmits an up-link radio signal which is depicted along a third or bottom row labelled 21(P). In the up-link radio signal, one of the time slots is a synchronized slot synchronized with the particular slot of the A down-link signal as exemplified by a still another rectangle. It should be noted that the synchronized slot is depicted as concurrent with the particular slot merely for brevity of the description which follows.

In the manner described in connection with FIG. 8, the B base station 15(B) receives the synchronized slot as a received slot in the manner depicted below the middle row by a rectangle to which an arrowheaded line is drawn from the synchronized slot. The A base station 15(A) receives the synshronized slot as illustrated below the top row by another rectangle to which the arrowheaded line is extended.

FIGS. 5, 8, and 9 will be referred to. A combination of the amplifier unit 61, the demodulator 63, and the received frame regenerator 65 serves as a receiving arrangement. In the A base station 15(A), the receiving arrangement receives the up-link radio signal from the particular base station 21(P). In the B base station 15(B), the receiving arrangement receives the up-link radio signal directed to the A base station 15(A), namely, to the different base station.

In the B base station 15(B), a reception time instant is indicated by a first reception timing signal produced by the receiving arrangement in response to a first received one of the time slots of the base station reception control signal or of the mobile-to-base communication data signal that is received nearest in time to the transmission timing puleses of the B base station 15(B). The first reception timing signal is delivered to the timing controller 53 of the B base station 15(B).

Comparing the transmission timing pulses with the first reception timing signal, the timing controller 53 of the B base station 15(B) calculates a time difference between the transmission and the reception time instants. The time difference is indicated in FIG. 9 by a reference symbol t(D). The time difference is stored in a memory 67.

Soon after production of the first reception timing signal, the receiving arrangement of the B base station 15(B) produces a second reception timing signal in response to a second received one of the received frames. The second reception timing signal is delivered to the base station control unit 35 of the B base station 15(B). In response, the base station control unit 35 reads the time difference from the memory 67 and checks whether or not the first or the second reception timing signal is produced in a correct time relationship relative to the transmission timing pulses, namely, to the transmission time instant.

More specifically, the time difference should theoretically be equal to zero. The time difference may, however, not be longer in practice than a predetermined time interval. The base station control unit 35 of the B base station 15(B) compares such a predetermined time interval with the time difference read out of the memory 67 and supplies the timing controller 53 with a timing adjust signal for adjusting the delivery of the transmission timing pulses to the transmission frame generator 51 and to the power amplifier 57 and to thereby control or adjust the transmission time instant. Preferably, the predetermined time interval should not be longer than the guard time.

It is possible to use the timing adjust signal in the base station control unit 35 of the B base station 15(B) in adjusting production of the transmission timing pulses for supply to the timing controller 53. In any event, the timing adjust signal represents an amount of adjustment by which delivery or production of the transmission timing pulses should be adjusted. The timing adjust signal may reperesent a difference calculated by subtracting the time difference from the slot length. In this event, delivery or production of the transmission timing pulses should be delayed in accordance with the difference. Alternatively, the amount of adjustment may be equal to a sum of the slot length end the time difference. In this case, delivery of production of the transmission timing pulses should be advanced by the sum.

It is now understood in FIG. 5 that a combination of the base station control unit 35, the timing controller 53, and the memory 67 serves as an adjusting arrangement for adjusting, based on the reception time instant, the transmission time instant of the base station under consideration. When used in the B base station 15(B), the adjusting arrangement adjusts the transmission time instant of the B down-link signal. The adjusting arrangement should leave the transmission timing pulses untouched if the time difference is not longer than the predetermined time interval. Another combination of the timing controller 53 and the memory 67 serves as a timing adjusting arrangement supplied with the transmission timing pulses and the first reception timing signal to calculate the time difference and to adjust delivery or production of the transmission timing pulses if the time difference is longer than the predetermined time interval.

While this invention has thus far been described in specific conjunction with a sole preferred embodiment thereof, it will now be readily possible for one skilled in the art to put this invention into practice in various other manners. For example, the timing adjusting arrangement need not comprise the memory 67 when each frame of the down-link radio signal consists essentially of only one time slot. In the amount of adjustment, it is possible to use an integral multiple of the slot length instead of only one slot length. Above all, it is possible to make the transmission timing pulses indicate both leading and trailing ends of each of a plurality of time slots which a TDMA frame comprises. Incidentally, the cellular TDMA mobile communication network may comprise a plurality of control stations, such as 17, with the control stations connected either collecitvely to the fixed communication network 19 or individually to a plurality of fixed communication networks.

What is claimed is:

1. A synchronization system for use in a cellular digital mobile communication network comprising a plurality of radio base stations and mobile stations communicative with said radio base stations through a time division multiplex radio communication link, wherein said synchronization system comprises, in each radio base station:

receiving means for receiving an up-link radio signal directed from a mobile station to a different one of said radio base stations to detect a reception time of said up-link radio signal, said up-link radio signal comprising up-link frames, said receiving means receiving said up-link frames as received frames to produce a first reception timing signal representative of said reception time in response to a first one of said received frames and producing a second reception turning signal in response to a second one of said received frames;

adjusting means for adjusting, based on a calculated time difference between said reception time of said up-link radio signal and a transmission time of said up-link radio signal, a transmission time of a down-link radio signal comprising down-link frames, said adjusting means comprising a base station control unit for producing transmission timing pulses indicative of said transmission time, and timing adjusting means supplied with said transmission timing pulses and said first reception timing signal for calculating a time difference between said reception time and a time indicated by one of said transmission timing pulses that is produced nearest in time to said reception time, a timing controller supplied with said transmission timing pulses and said first reception timing signal to calculate said time difference, and a memory loaded with said time difference, said base station control unit being supplied with said second reception timing signal to read said time difference from said memory and to produce a timing adjust signal if said predetermined time interval is not shorter than the time difference read by said second reception timing signal, said timing controller adjusting said transmission timing pulses in response to said timing adjust signal;

said timing adjusting means adjusting said transmission timing pulses if said time difference is not shorter than a predetermined time interval upon production of said second reception timing signal; and transmitting means for transmitting, based on said calculated time difference, said down-link radio signal.

2. A synchronization system for use in a cellular digital mobile communication network comprising a plurality of radio base stations and mobile stations communicative with said radio base stations through a time division multiplex radio communication link, said plurality of radio base stations comprising an A and a B base station transmitting to said mobile stations an A down-link signal and a B down-link signal comprising down-link frames, each as said down-link signal, wherein said synchronization system comprises in said B base station:

receiving means for receiving an up-link radio signal comprising up-link frames directed from said mobile station to said A base station to measure said reception time by producing a first reception timing signal representative of said reception time in response to a first one of said up-link frames;

adjusting means for adjusting, based on a calculated time difference between said reception time of said up-link radio signal and a transmission time of said up-link radio signal, a transmission time of said B down-link signal to said mobile stations, said calculated time difference corresponding to said reception time; and transmitting means for transmitting, based on said calculated time difference, said down-link radio signal;

said adjusting means comprising:

a base station control unit for producing transmission timing pulses indicative of said transmission time; and timing adjusting means supplied with said transmission timing pulses and said reception timing signal for calculating a time difference between said reception time and a time indicated for one of said transmission timing pulses that is produced nearest in time to said reception time, said timing adjusting means comprising:

a timing controller supplied with said transmission timing pulses and said first said reception timing signal to calculate said time difference; and a memory loaded with said time difference;

said base station control unit being supplied with said reception timing signal to read said time difference from said memory and to produce a timing adjust signal if said predetermined time interval is not shorter than the time difference read by said second reception timing signal;

said timing controller adjusting said transmission timing pulses in response to said timing adjust signal;

said receiving means producing a second reception timing signal in response to a second one of said received frames;

said timing adjusting means adjusting said transmission timing pulses if said time difference is not shorter than a predetermined time interval upon production of said second reception timing signal.

3. A synchronization system as claimed in claim 1, said up-link radio signal comprising up-link frames, said radio base station transmitting towards said mobile station a down-link radio signal comprising down-link frames, wherein:

said receiving means receives said up-link frames as received frames to produce a first reception timing signal representative of said reception time in response to a first one of said received frames;

said adjusting means comprising:

a base station control unit for producing transmission timing pulses indicative of said transmission time; and timing adjusting means supplied with said transmission timing pulses and said first reception timing signal for calculating a time difference between said reception time and a time indicated by one of said transmission timing pulses that is produced nearest in time to said reception time instant;

said receiving means producing a second reception timing signal in response to a second one of said received frames;

said timing adjusting means leaving said transmission timing pulses untouched if said time difference is shorter than a predetermined time interval upon production of said second reception timing signal.

4. A synchronization system as claimed in claim 3, wherein each of said down-link frames is preceded by a guard time, and wherein said predetermined time interval is not longer than said guard time.

5. A synchronization system as claimed in claim 1, each down-link frame comprising a plurality of time slots having a slot length in common, wherein:

said base station control unit makes said timing adjust signal indicate a difference calculated by subtracting said time difference from said slot length;

said timing controller delaying said transmission timing pulses by the difference indicated by said timing adjust signal.

6. A synchronization system as claimed in claim 1, each down-link frame comprising a plurality of time slots having a slot length in common, wherein:

said base station control unit makes said timing adjust signal indicate a sum of said slot length and said time difference;

said timing controller advancing said transmission timing pulses by said sum.

7. A synchronization system as claimed in claim 1, each slot length being preceded by a guard time, wherein said predetermined time interval is not longer than said guard time.

8. A synchronization system as claimed in claim 2, said up-link radio signal comprising up-link frames, said B down-link signal comprising down-link frames, wherein:

said receiving means receives said up-link frames as received frames to produce a first reception timing signal representative of said reception time instant in response to a first one of said received frames;

said adjusting means comprising:

a base station control unit for producing transmission timing pulses indicative of said transmission time instant; and timing adjusting means supplied with said transmission timing pulses and said first reception timing signal for calculating a time difference between said reception time instant and a time instant indicated by one of said transmission timing pulses that is produced nearest in time to said reception timing instant;

said receiving means producing a second reception timing signal in response to a second one of said received frames;

said timing adjusting means leaving said transmission timing pulses untouched if said time difference is shorter than a predetermined time interval upon production of said second reception timing signal.

9. A synshronization system as claimed in claim 8, each down-link frame comprising a plurality of time slots having a slot length in common with each time slot preceded by a guard time, wherein said predetermined time interval is not longer than said guard time.

10. A synchronization system as claimed in claim 2, each down-link frame comprising a plurality of time slots having a slot length in common, wherein:

said base station control unit makes said timing adjust signal indicate a difference calculated by subtracting said time difference from said slot length;

said timing controller delaying said transmission timing pulses by the difference indiceted by said timing adjust signal.

11. A synchronization system as claimed in claim 2, each down-link frame comprising a plurality of time slots having a slot length in common, wherein:

said base station control unit makes said timing adjust signal indicate a sum of said slot length and said time difference;

said timing controller advancing said transmission timing pulses by said sum.

12. A synchronization system as claimed in claim 2, each slot length being preceded by a guard time, wherein said predetermined time interval is not shorter than said guard time.

* * * * *